May 21, 1940.  F. K. McCUNE  2,201,836
MAGNETIC MOTION AMPLIFIER
Filed March 3, 1939
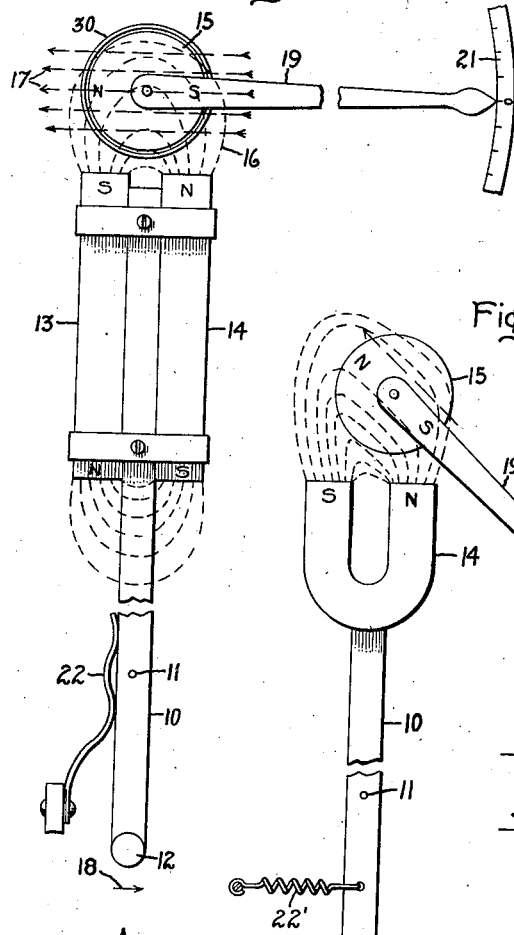
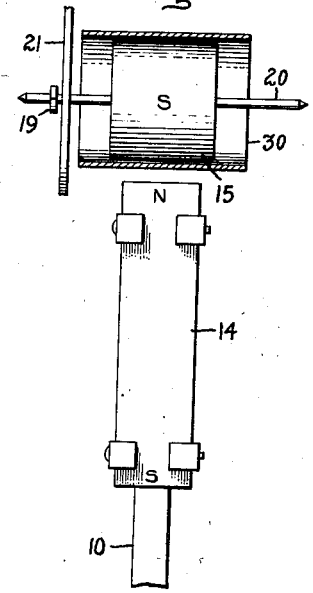
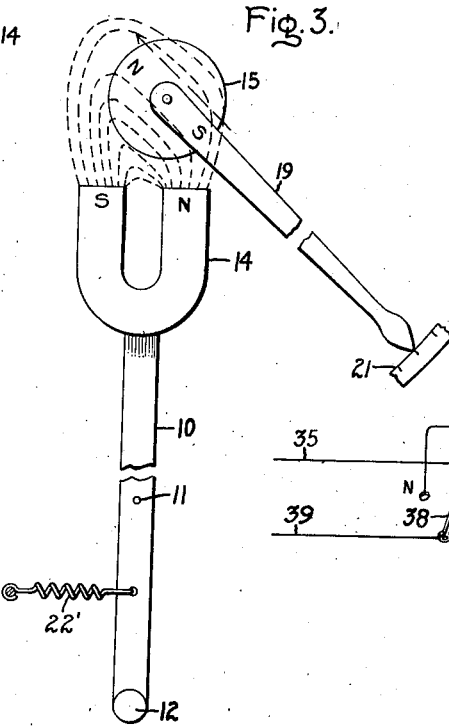
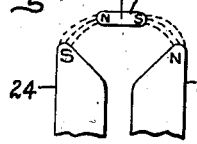
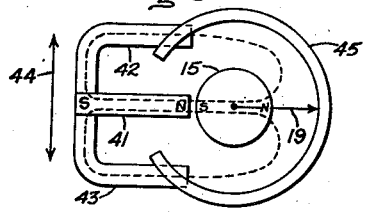
Inventor:
Francis K. McCune,
by Harry E. Dunham
His Attorney.

Patented May 21, 1940

2,201,836

UNITED STATES PATENT OFFICE 2,201,836

MAGNETIC MOTION AMPLIFIER

Francis K. McCune, Swampscott, Mass., assignor to General Electric Company, a corporation of New York Application March 3, 1939, Serial No. 259,690

10 Claims. (Cl. 236—1)

My invention relates to magnetic means for transmitting, amplifying and modifying mechanical movements and is particularly useful for magnifying small measuring movements in order that they may be indicated as used on a greatly expanded scale. The invention is also useful in transmitting motion from one mechanical device to another without a mechanical connection between such devices and with a suitable degree of resiliency such that undesirable vibration or jerky movements of one part are not transmitted to the other as they would be with a conventional mechanical connection.

The features of my invention which are believed to be novel and patentable will be pointed out in the claims appended hereto. For a better understanding of my invention, reference is made in the following description to the accompanying drawing in which Fig. 1 represents an axial view of one form of my magnet motion amplifying scheme as applied to a dial gauge; Fig. 2 is a side view of the parts shown in Fig. 1; Fig. 3 is a view as in Fig. 1 but with a modified form of magnet and the parts shown in different relative positions; Fig. 4 shows a modified form of pole pieces and armature that may be used; Figs. 5 and 6 are other forms of pole pieces that may be employed; Fig. 7 is a thermostat contact control device employing my invention; and Fig. 8 shows an extra long scale-producing arrangement embodying my invention.

In Fig. 1 let it be assumed that the lower end 12 of lever 10 is moved horizontally about pivot 11 by a small amount in accordance with some measurement to be indicated. The upper end of this lever carries permanent magnet means such as the bar magnets 14 and 13 having opposite poles spaced apart adjacent each other in the path of measurement movement of the lever as shown, so as to provide a pair of upwardly projecting spaced pole pieces of opposite polarity. Such magnet means may be in the form of a horseshoe magnet 14 as shown in Fig. 3. Spaced away from and above these magnet pole pieces is a rotary mounted cylindrical permanent magnet armature 15 with its axis of rotation parallel with pivot 11. Armature 15 is polarized across a diameter thereof and is free to turn to align its field with that produced by the upwardly projecting pole pieces of magnets 14 and 13. The armature 15 is positioned symmetrically with respect to the pole pieces of magnets 14 and 13 when the lever 10 is in a central measurement position. The field produced by magnets 14 and 13 is represented by the curved lines 16 while the field produced by magnet 15 is in the direction represented by horizontal arrows 17. It is evident that armature 15 will turn into the position shown where the greatest flux is common to both magnet systems along the shortest path between them. It may be stated that in Fig. 1 where the pole pieces on lever 10 are equally distant from armature 15, the attractive forces between opposite poles on lever 10 and armature 15 are balanced when the armature poles are equally spaced from the pole pieces on lever 10. The fluxes of the two magnet systems join in a common series path in a plane at right angles to the axis of rotation of armature 15.

If, now, lever 10 be rotated counter-clockwise about its pivot 11 in a plane at right angles to the axis of rotation of armature 15 by a small amount in accordance with a measurement movement or force applied to it at any point, for example, at its lower end 12, as represented by arrow 18, the north pole on lever 10 adjacent armature 15 will approach closer to the armature and the adjacent south pole on lever 10 will move further from the armature. Also the poles on lever 10 have been given a component of movement about the armature in a clockwise direction. The attractive forces between the south pole of armature 15 and the adjacent north pole of lever 10 will increase while the attractive forces between the other poles of armature and lever will decrease and the directions of these forces have shifted clockwise about the armature. This causes the armature to turn in a direction opposite to that of the direction of rotation of lever 10 about pivot 11 and the flux lines rearrange themselves in the general way represented in Fig. 3.

In Fig. 3 it will be noted that the flux lines between the north pole on lever 10 and the south pole of the armature have a somewhat shorter torque arm or leverage action in attempting to turn armature 15 clockwise than do the flux lines between the armature N pole and the south pole on lever 10 in attempting to turn the armature counterclockwise. Thus the armature turns into a position where the magnetic forces involved are again balanced in their turning effect upon the armature. The armature thus turns to some such position as represented in Fig. 3. This turning of the armature is proportional to the displacement of lever 10 from a central position, and over a considerable range the movement ratio may be made approximately linear and at the same time the angular rotation of lever 10 is greatly magnified in rotation of armature 15. Rotation of lever 10 clockwise about pivot 11 from the central or symmetrical condition shown in Fig. 1 will cause rotation of armature 15 counter-clockwise by a corresponding amplified amount. I may thus provide a pointer 19 on the shaft 20 of armature 15 and have it indicate on a scale 21. It is apparent that rotation of armature 15 may be used for any other suitable purpose such as for controlling or for recording or transmitting its rotational movement.

When the lever 10 is moved from a central position to the position represented in Fig. 3, for example, the flux lines between the permanent magnet systems are distorted and somewhat longer than in Fig. 1. Hence, when the displacement force at 18 is removed, there is some force, due to the flux lines tending to shorten these paths, which tends to return armature 15 and lever 10 to a central position. In a zero center scale arrangement this centering action may, where desirable, be augmented by a weak centering spring such as is represented at 22, arranged to help return lever 10 to a central position from a displacement in either direction from center. Likewise the zero may be arranged at one end of the scale as by providing a spring such as shown at 22', Fig. 3. The movement of pointer 19 over scale 21 may be calibrated to indicate the units being measured.

The extent to which the movement of lever 10 is amplified may be varied considerably. For example, the ratio of the lengths of the parts of lever 10 on opposite sides of its pivot point 11 may be chosen as desired. Other things being equal, decreasing the diameter of armature 15 and moving it closer to the end of lever 10 increases the amplification of movement at this point. Also pointer 19 may be made any desired length within practicable limits. A variety of scale distributions may be had by changing the shape of the armature 15 and pole pieces on lever 10.

Fig. 4 shows a bar shaped armature 23 cooperating with outwardly tapered pole pieces 24 and 25. Fig. 5 shows inwardly tapered pole pieces 26 and 27. Fig. 6 shows pole pieces 28 and 29 both tapered on the same side. Each arrangement or combination will produce its own particular scale distribution and range. The pole piece arrangement of Fig. 4 will produce greater torque than the pole piece arrangement of Fig. 5 but the range of rotation of the armature will be greatest with Fig. 5, other things remaining unchanged. The pole piece arrangement of Fig. 6 will cause the scale distribution to be unsymmetrical on opposite sides of center which may be desirable in certain cases.

In a conventional form of dial gauge a pivoted lever such as lever 10 is mechanically connected to a pivoted pointer such as pointer 19 through a rack and pinion. In such an arrangement every bump, vibration or other sudden movement of the lever is conveyed to the pivoted pointer and causes noise, excessive wear and sometimes breakage of the gear teeth and pivots. Back lash in the gearing produces errors in the indication. In my magnetic motion amplifying arrangement these difficulties are not present. The magnetic coupling provides a cushioning connection through which undesirable vibration and jars to which lever 10 may be subjected are not transmitted to pointer 19 and its pivot. Yet it does accurately transmit reasonably fast measurement displacements of lever 10. In many cases I prefer to provide a stationary cylinder 30 of conducting material about the permanent magnet armature 15 to serve as a damper for the armature and its pointer. This also serves as a guard about the armature.

The permanent magnet parts of this device are made of high coercive force material and are preferably sufficiently knocked down or demagnetized before calibration and use that they will remain of constant strength during long use. However, it may be noted that weakening of either permanent magnet system does not change the motion transmission characteristics other than the torque. Hence, unless the torque requirements are quite high, as where armature 15 is used to operate a curve drawing pen arm or the like small change in the strength of the permanent magnets is not likely to produce any error in calibration.

The armature 15 may be made of a light weight sintered oxide such as is described in United States Letters Patent No. 2,101,665, December 7, 1937, to Arey and Faus. It is preferably somewhat longer than the width of the pole pieces of the permanent magnet on lever 10 as represented for example in the side view, Fig. 2. The permanent magnets or magnet carried on lever 10 may be made of any good coercive force magnetic material which provides good permanent flux strength without unnecessary bulk and weight. In the form of magnet system represented in Fig. 1 I have used an alloy comprising approximately 87% silver, 4.3% aluminum, and 8.7% manganese and having a coercive force of about 6000 oersteds. In this case the magnets 14 and 13 had a cross-section of $\frac{1}{8}$ x $\frac{3}{32}$ inch, were $\frac{3}{8}$ of an inch long and their centers were spaced apart tangentially of the armature about 0.1 inch. This was used on a lever 10, 2 inches in length from pivot 11 to the upper end of magnets 14 and 13 and $\frac{5}{8}$ of an inch in length from pivot 11 to lower end 12. Using a sintered oxide rotor $\frac{3}{16}$ of an inch in diameter and positioned $\frac{1}{32}$ of an inch away from the plane of the upper pole faces of magnets 14 and 13, when centered as in Fig. 1 and using a pointer 2 inches long at 19, I obtained a deflection at the end of the pointer over the central part of the scale of $\frac{1}{16}$ inch for .001 inch of movement at point 12, or an amplification of over 60 to 1. While the invention is not limited to any particular dimensions or dimensional relations, those which I have mentioned above serve to illustrate that the device may be made very small and light in weight and still obtain great amplification of movement. In general, the spacing of the pole pieces of 13 and 14 should be not less than the radius of the cylinder or greater than twice its diameter to obtain the best results. In the above mentioned illustration the amplification of the magnetic amplifier alone is nearly five times. That is, the arc of travel of a point on the periphery of armature 15 is about five times as long as the arc of travel of the adjacent pole faces of magnets 14 and 13 substantially tangentially of the armature. In a rack and pinion arrangement the travel of the contacting surfaces and rack and pinion would necessarily be the same. The amplification of the magnetic coupling is greatest over the central range of operation and decreases rapidly in the vicinity of about 90 degrees deflection from center.

180 degree scales at 21 are feasible, i. e., 90 degrees each way from center. The deflection may be carried slightly beyond this range but there is no amplification benefit and the magnetic coupling decreases in torque.

In accordance with good practice it will be desirable to provide a casing for the device which is of magnetic material for shielding purposes. Such casing should be spaced sufficiently from the permanent magnets 14, 13 and 15 as to avoid interfering with favorable operation.

Fig. 7 shows the application of my invention to a contact making and breaking thermostat which may be employed, for example, for controlling temperature in domestic heating installations. At 31 is an ordinary bimetallic temperature responsive lever element secured at its lower end 32 as a fixed pivot and provided with a small horseshoe-shaped magnet 14 on its upper free end. The two strips of elements 31 are made of materials which expand unequally on a rise in temperature and hence the upper end deflects in one direction, say to the left, with a rise in temperature and to the right with a decrease in temperature. For highly accurate temperature control purposes such deflection is often too small for direct operation of control contacts in a satisfactory manner and hence I provide my motion amplifier between the thermostat strip 31 and the control contacts. The polarized armature previously described is represented at 15 on a shaft 20.

On shaft 20 is a pair of mercury switches 33 and 34 of the button type. Such a switch comprises a small discus-shaped vessel divided into two axial compartments by a partition of insulating material through its center. There is an off-center hole in the partition. The two sides of the vessel are of metal and constitute the circuit terminals. A small amount of mercury is contained in the vessel. When the device is rotated on its axis, the opening in the partition is rotated above or below the level of the mercury and when below, mercury floods the opening and completes the circuit. Such a switch is mechanically self-balancing, small in size, light in weight and offers little resistance to rotation. For illustration purposes the near compartments of these switches have been assumed to be transparent in order to indicate the mercury and partition openings.

The circuit connection 35 is common to both switches. Connections 36 and 37 are the other circuit connections to switches 33 and 34, respectively. Switch 34 may be assumed to be the high temperature day control and 33 the low temperature night control switch. Hence, by throwing swit 't. indicated at 38, either day or night control on the control wires 35, 39 may be had as desired. The armature 15 will be centered with respect to the magnets 14 for about the center of the temperature control range. Now, let us assume that for a rise in temperature 31 deflects to the left, in which case armature 15 and the switches will rotate clockwise for a temperature rise. Let it further be assumed that we desire to close switch 34 at 70 degrees decreasing temperature and open it at 70 degrees rising temperature. For this purpose the device is placed in a temperature of 70 degrees and switch 34 rotatively adjusted on shaft 20 until the opening in its partition is just at the level of the mercury to the left of its axis of rotation, about as indicated. Then for a rise in temperature the opening in the partition rises above the mercury level to open the switch and for a decrease in temperature it moves below the mercury level to close or maintain the switch closed. Switch 33 is rotatively adjusted in the same manner but for the night control temperature, say of 65 degrees. The important advantage of my invention to this application is high accuracy as only a small movement of the bi-metallic strip 31 will produce appreciable rotation of armature 15 and of the mercury switches. Sticking and weak presssure arcing contacts and dirty contacts which often cause trouble with the ordinary exposed contact thermostat control are avoided. Obviously the magnetic torque is ample here for the purposes described. I may provide a pointer 19 on shaft 20 for indicating temperature on scale 21. Also, stop 40 for pointer 19 just beyond the upper and lower temperature limits may be provided in order that the switches will not rotate beyond these limits and get out of their proper operative relation under extreme temperature conditions. The stop and pointer 19 may also be used as mechanical switch contacts if desired.

Fig. 8 represents an embodiment of my invention for producing an extra long scale distribution. In this arrangement 41 represents a bar permanent magnet to one end of which are attached soft iron pole pieces 42 and 43 bent back towards the armature 15 to provide three spaced poles of alternate polarity. This will produce a balanced flux distribution and central rotary position of the armature shown when the E-shaped magnet system 41, 42, 43 is centralized as shown. When the magnet system 41 is shifted from center over the range indicated by arrow 44 the return flux of magnet 41 shifts from one soft iron pole piece to the other, depending on the direction of shift. For example, if magnet 41 be moved downward the return flux flows mostly through pole piece 42 or it approaches the armature and it together with magnet 42 then acts much like the spaced pole pieces of magnets 13, 14 of Fig. 1 for deflection of pointer 19 over the upper half of scale 45. In this way the scale range may be increased as indicated.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A motion amplifier comprising a cylindrical permanent magnet polarized across its diameter and pivoted for rotation on its axis, a movable member including permanent magnet means presenting pole pieces of opposite polarity to said cylindrical permanent magnet, said poles being spaced apart closely tangentially of said cylindrical permanent magnet a distance not less than the radius of said cylindrical magnet and out of contact therewith, said movable member being movable at right angles to the axis of said cylinder and substantially tangentially thereto.

2. A motion amplifier comprising a permanent magnet member, pivoted for rotation on an axis midway between its magnetic poles, a movable member including permanent magnet means presenting pole pieces of opposite magnetic polarity to said pivoted permanent magnet, said pole pieces being spaced apart closely tangentially of the pivoted permanent magnet a distance between one-half and twice the distance between the magnetic poles of the pivoted magnet and out of contacting relation with said pivoted magnet, said movable member being movable at right angles to the axis of rotation of the pivoted magnet and substantially tangentially thereto.

3. An amplifying transmitter for measurement movements comprising a permanent magnet pivoted for rotation between its magnetic poles, permanent magnet means closely adjacent to the path of rotation but out of contacting relation with the pivoted permanent magnet, said permanent magnet means presenting magetic poles of opposite magnetic polarity spaced apart tangentially relative to the path of rotation of the pivoted permanent magnet such that the permanent magnet fluxes of both systems tend to close in a common path, the plane of which is perpendicular to the axis of rotation of the pivoted magnet, said permanent magnet means being movable in said plane in response to the measurement to be amplified and transmitted.

4. In a measuring system a lever member having a free end movable in one plane in response to a measurement, permanent magnet means carried by and movable with said free end, said means having pole pieces of opposite magnetic polarity spaced apart in the plane of movement, a permanent magnet armature pivoted midway between its pole pieces on an axis of rotation at right angles to the plane of movement of said lever, said pivoted armature being spaced closely adjacent but out of contact with said permanent magnet means such that the fluxes of both join in series relation and a measurement movement of said lever causes a rotational movement of said armature, the relative spacing of the pole pieces of the armature and permanent magnet means being such that the pole pieces of the armature move a greater distance than the free end of said lever, a pointer rotated by said armature, and a scale with which said pointer cooperates, said scale being calibrated with the magnetic motion transmission in terms of the measurement to which said lever responds.

5. In a measuring system, a device movable in opposite directions from a central position in response to measurements, permanent magnet means carried by and moved by said device, said permanent magnet means having pole pieces of opposite magnetic polarity spaced apart in the direction of such movement, a cylindrical permanent magnet armature polarized across a diameter thereof and pivoted for rotation on an axis at right angles to the path of movement of said permanent magnet means, said armature being closely adjacent but out of contact with said permanent magnet means such that their fluxes join in series relation and a measurement movement of said device and permanent magnet means causes rotation of said armature, said armature being symmetrically positioned with respect to the pole pieces of said permanent magnet means when the movable device is in its central measurement position, the diameter of said armature being so related to the spacing of the pole pieces on said movable device that the periphery of the armature moves a greater distance than such pole pieces when movement of device from a central position occurs.

6. In a measuring system, a pivoted lever movable about its pivot in response to measurements, means for biasing said lever to a central measurement position, permanent magnet means carried by and moved by said lever, said means having pole pieces of opposite magnetic polarity spaced apart in the path of the measurement movement thereof, a polarized cylindrical armature freely pivoted for rotation on an axis parallel with the pivot of said lever, said permanent magnet means being positioned between said pivots when the lever is in a central measurement position with the pole pieces of the permanent magnet means equally distant from and closely adjacent but out of contact with said armature, the radius of said lever from its pivot to the pole pieces being considerably greater than the radius of said armature and the relative spacing of said pole pieces with respect to the diameter of the armature being such that a measurement movement of the pole pieces produces a greater relative movement of the periphery of the armature.

7. In a motion transmitting and amplifying system, a movable member the motion of which is to be amplified, including permanent magnet means having pole pieces of opposite magnetic polarity spaced apart in the path of movement, a polarized armature pivoted for rotation on an axis perpendicular to the path of movement of said spaced pole pieces and closely adjacent such path, such that torque is transmitted magnetically between said pole pieces and armature when the pole pieces are moved past said armature, thereby causing the armature to rotate, said armature being polarized across a diameter thereof and having a diameter between one-half and twice the spacing of said pole pieces, and a stationary damping member of conducting material in the path of the flux between said armature and spaced pole pieces.

8. In combination, a measuring device, permanent magnet means having a pair of pole pieces of opposite magnetic polarity moved by said device in accordance with the measurement, said pole pieces being spaced apart in the path of movement thereof, a cylindrical permanent magnet armature polarized across a diameter thereof and pivoted on its axis perpendicular to the path of movement of said pole pieces and located closely adjacent said path such that the fluxes of said permanent magnet means and polarized armature combine to provide a magnetic drive between them whereby the armature is rotated by the measurement movement of said pole pieces, the relative spacing of said pole pieces with respect to the diameter of the armature being such that a movement of said pole pieces a distance equal to their spacing rotates said armature in excess of 45 degrees, and means operated by rotation of said armature in response to such measurement.

9. In combination, a bimetallic temperature responsive device fixed at one end and adapted to bend in response to temperature changes, permanent magnet means on the free end of said device provided with spaced pole pieces of opposite magnetic polarity, said pole pieces being spaced apart in the path in which they are moved by bending of said device, a cylindrical permanent magnet armature polarized across a diameter thereof and pivoted on its axis perpendicular to the path of movement of said pole pieces and located adjacent such path such that the fluxes of said permanent magnet means and armature combine to provide a magnetic drive for rotating the armature when the pole pieces are moved, the relation of spacing of said pole pieces and the diameter of said armature being such that the movement of the surface of said armature which is adjacent to said pole pieces greatly exceeds the movement of the pole pieces, and control means operated by rotation of said armature.

10. A magnetic device for the transmission and amplification of measurement movements comprising a cylindrical permanent magnet armature polarized across a diameter and pivoted on its axis, and an E-shaped magnetic structure, the middle leg of which is a permanent magnet and the outer legs of which are of a material having the magnetic properties of soft iron, the three open ends of said structure forming pole pieces of alternate magnet polarity, said E-shaped structure extending in a plane at right angles to the axis of the armature with its pole pieces closely adjacent and facing the armature but out of contact therewith, said E-shaped structure having a central position where its middle leg is in alignment with the center of the armature and being movable in opposite directions from said position so as to bring either of its outer legs into approximate alignment with the center of the armature, said movements causing rotation of said armature in opposite directions from a central position in excess of 45 degrees.

FRANCIS K. McCUNE.